June 29, 1965   R. A. JOHNSTON   3,191,810
COMPOSITE MILK PACKAGE
Filed Sept. 30, 1963   2 Sheets-Sheet 1

INVENTOR.
RICHARD A. JOHNSTON
BY McLaughlin & Cahill
ATTORNEYS

June 29, 1965  R. A. JOHNSTON  3,191,810
COMPOSITE MILK PACKAGE
Filed Sept. 30, 1963  2 Sheets-Sheet 2
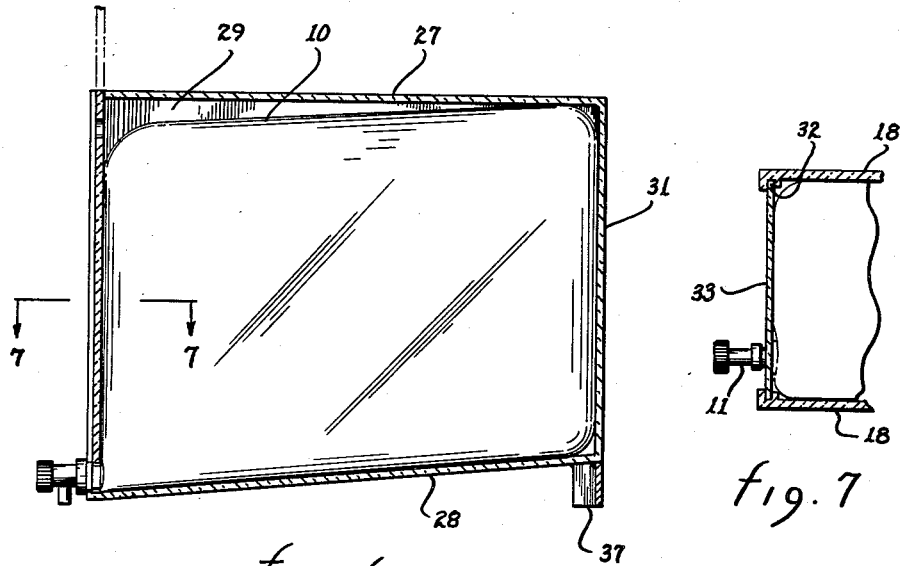
fig. 6
fig. 7
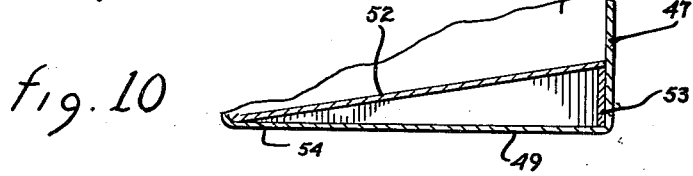
fig. 10
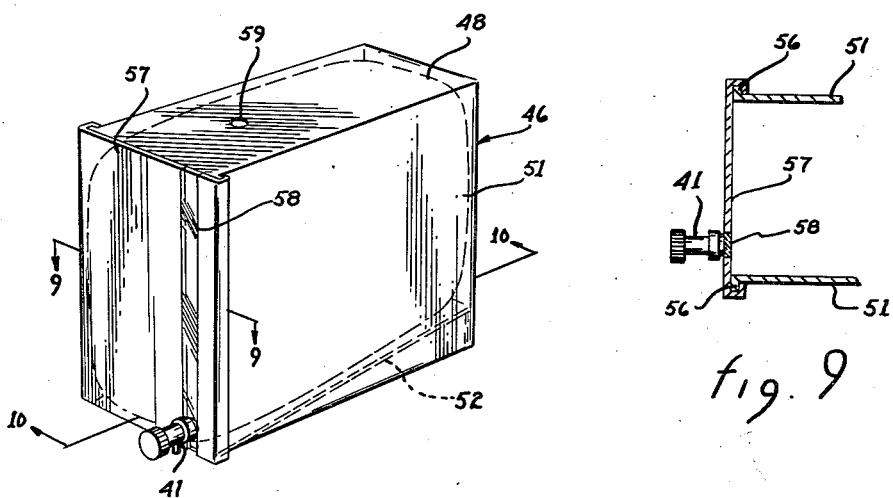
fig. 8
fig. 9
INVENTOR.
RICHARD A. JOHNSTON
BY McLaughlin & Cahill
ATTORNEYS

United States Patent Office 3,191,810
Patented June 29, 1965

3,191,810
COMPOSITE MILK PACKAGE
Richard A. Johnston, 203 E. Del Rio Drive, Tempe, Ariz.
Filed Sept. 30, 1963, Ser. No. 312,563
10 Claims. (Cl. 222—183)

My invention relates to an improved milk package or the like. It relates more in particular to an improved milk package containing a relatively large supply of milk, and adapted to be placed on the shelf of a refrigerator or the like; and milk withdrawn from the package through a discharge spout if desired.

The vending of milk to ultimate consumers such as the housewife has gone through a considerable development since milk was vended from open containers by means of a measuring vessel which was dipped into open containers and the contents of the measuring vessel then poured into a recepticle provided by the ultimate consumer. Pasteurizing and sanitary precautions generally have required that milk be packaged; and generally we have gone from various types of glass bottles to special types of paper cartons, and these in turn have gone to larger sizes including half gallon and gallon cartons. Costs, however, have continued to mount and the retail milk distributor has found that time after time the housewife has insufficient space in her refrigerator for all of the milk she uses, so that she must replenish her supply from local stores. This not only adds to the burden of the housewife, but it also results in a situation in which the dairy making the delivery loses a large amount of sales. Loss of sales then further increases the overall cost per unit package of milk.

The principal object of my present invention is the provision of an improved milk package.

Another object is the provision of an improved milk package which reduces markedly the cost of delivering a unit of milk.

Still another object of this invention is the provision of a milk package which permits the housewife to store a much larger amount of milk in the usual household refrigerator.

According to the general features of the invention, a suitable amount of milk, preferably from two to three gallons is introduced immediately after pasteurization into a flexible bag having a dispensing spout, which spout may also be used for filling. This flexible bag is then introduced into a rigid housing in the form of a container which it fits snugly. The container preferably has five integral sides and one open side, the open side adapted to be closed by a sliding panel to retain the flexible bag in the housing. The sliding panel preferably is transparent or at least has a transparent portion, the body portion of the container being either opaque or plastic. All of the parts including the flexible bag and container are preferably formed of a suitable plastic material and are inexpensively produced.

The panel is preferably provided with a bottom opening through which the spout attached to the flexible milk containing bag is projected and the bottom surface on which the flexible bag rests being slanted towards the spout, substantially all of the milk in the bag may be removed without tipping or otherwise handling the container.

The containers are so dimensioned suitably that a given number of them, optionally three, will fit into a standard milk case now conventionally made of wire, shaped and welded together to produce a rigid sanitary milk container support. According to the preferred use of the container the flexible bag alone is delivered to the customer, the supporting outer container in the customer's refrigerator normally not being returned. While the container's outer portion may be of the identical construction whether carried by the milk delivery man or placed in the customer's refrigerator, preferably a relatively inexpensive and less sophisticated container is used by the milk delivery man.

Accordingly, a further object of the invention is the provision of outer supporting containers of two types, both snugly supporting the flexible milk containing bag, but each designed to meet the particular requirements of the point of use, but otherwise being completely interchangeable in all respects.

Other specific objects and features of the invention will be apparent from the following detailed description taken with the accompanying drawings wherein:

FIG. 6 is a slightly enlarged sectional view taken on the line 6—6 of FIG. 4, showing a construction of the outer container to provide a slanting bottom, the view differing from FIG. 4 in that a delivery spout has been substituted for the cap which is on the flexible bag when it is delivery to the housewife;

FIG. 7 is a fragmentary sectional view taken on the line 7—7 of FIG. 6 and showing one manner in which the front panel may be placed in slidable relation with the body portion of the outer container;

FIG. 8 is a perspective view showing a modification;

FIG. 9 is a fragmentary sectional view taken on the line 9—9 of FIG. 8; and

FIG. 10 is a fragmentary sectional view showing the sloping false bottom in the FIG. 8 embodiment.

Figure 1:
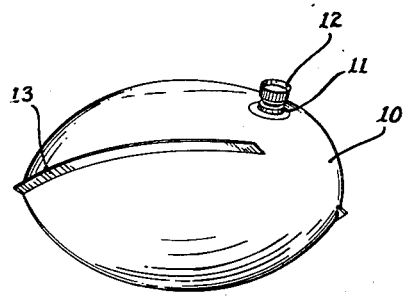
FIG. 1 is a perspective view showing a flexible milk container filled with milk preparatory to being lodged in its outer container.

Referring now to the drawings, a flexible bag 10 is provided within a side wall of which a spout 11 is sealed. The spout 11 contains an outer thread and normally is closed by a cap 12 while the flexible bag containing the milk is in transportation to the point of ultimate use. The flexible bag may be produced in any suitable manner but suitably a single plastic sheet or a plurality of plastic sheets, depending upon the specific material and its strength, are folded on themselves to make a double thickness with their side edges aligned. The edges are then sealed in any suitable manner such as by the application of heat if the plastic used happens to be a thermoplastic. Any of these usual sealing methods may, of course, be used. Preferably the seal occurs some distance away from the edge so that on three sides of the completed bag projecting edges 13 will appear, one side edge of the plastic sheet. The plastic bag, of course, may be as indicated in FIG. 1 being formed by the folding over formed directly as such in which case the specific final structure will vary somewhat.

Figure 2:
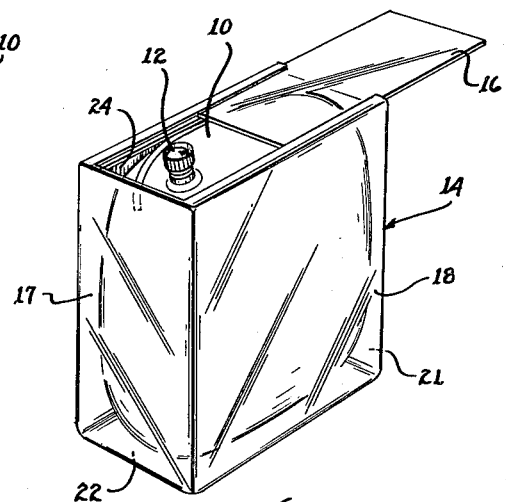
FIG. 2 is a perspective view of an entire container with the sliding panel partially removed, the outer portion of the container being of the type preferably employed for delivery purposes.
Figure 3:
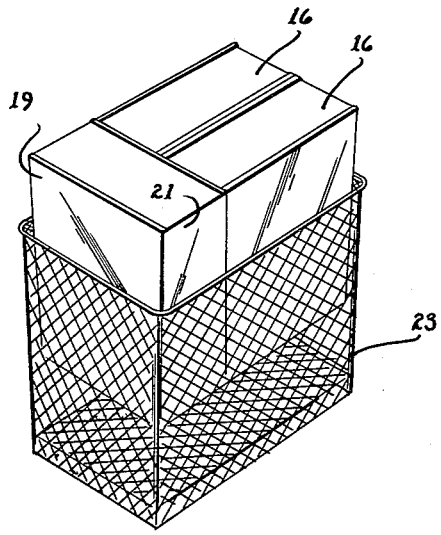
FIG. 3 is a perspective view showing the manner in which a given number of such containers may be designed to fit snugly within a standard type of case.

After the plastic bag has been filled with milk, it is placed in a form retaining, generally rectangular outer container having a body portion indicated by the reference character 14 and a sliding panel 16 functioning to close the one open side of the body portion of the container. Body portion 14 thus has five integral sides, generally at right angles to each other, including a bottom 17, sides 18, and a top 21, and an end 22. The panel 16 serves as the opposite end. It will be noted that during the time that the bag 10 is introduced as shown in FIG. 2 the normal position of the package is reversed and the panel 16 is on top. When the panel is completely closed the cap 12 is entirely within the outer container portion. As FIG. 3 shows, the entire milk package is dimensioned so that a given number will fit snugly within a standard type of milk case 23. In this position also the panel 16 is preferably left uppermost.

As FIG. 2 also shows, the open side of the body portion of the container is finished to provide a pair of grooves 24 for slidably receiving the panel 16 to complete the assembly. In the form shown in FIG. 2 the panel is imperforate.

Figure 4:
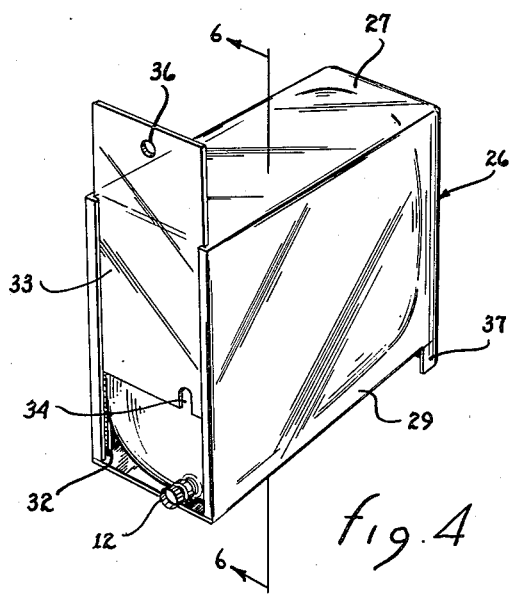
FIG. 4 is a perspective view of the milk package of the present invention adapted for use in a customer's refrigerator, the front panel being partly lifted to show structural features.
Figure 5:
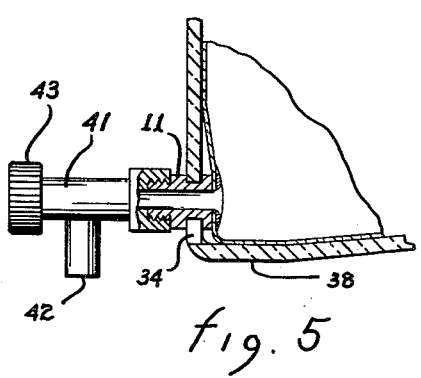
FIG. 5 is a fragmentary sectional view partly in elevation showing the application of a simple form of delivery spout to the flexible milk container.

FIGS. 4 through 7 show a preferred form of outer container for utilization at the point of ultimate consumption of the milk. Here a body portion 26 has five integral sides including a top 27, a forwardly sloping bottom 28, sides 29, and a back 31. Projections provided on the sides 29 and bottom 28 form a slot 32 for receiving a front panel 33. The panel has a bottom recess 34, side edges of which engage in an annular recess in the spout 11 as shown in FIG. 5. The panel 33 is also provided with a hole 36 through its top edge. This provides means for inserting a finger to lift the panel when it is to be removed. It also functions to allow air to enter the outer container above the level of the flexible bag 10 as shown in FIG. 6 so that as milk is withdrawn from the bag at the bottom, the bag can collapse and air will replace the milk at the top collapsed portion of the bag.

It will be noted particularly by reference to FIG. 6 that the top 27 and bottom 28 are not exactly parallel, the bottom sloping upwardly toward the back 31. An extension in the form of a support 37 running entirely across the back of the container and integral therewith supports the container in the position shown in FIG. 6, a forward flattened portion 38 of narrow configuration acting as a support at the forward ends of the container. Since the engagement of the spout 11 by the portion of the panel defining the recess 34 holds the spout at a lowermost position, the sloping bottom will cause practically all of the milk within the flexible bag to be delivered through the spout without the necessity of tilting or otherwise manipulating the package.

The package shown in FIGS. 4 through 7 is primarily intended for use in a household refrigerator. Normally, the open side or front of the body portion of the container will be faced upwardly when the flexible bag 10 filled with milk is introduced. At this time, closure cap 12 may be removed and a simple form of draw spout 41 applied in its place. The construction of the draw spout is insignificant so far as the present invention is concerned but preferably it contains a downspout 42 through which discharged milk is delivered to a suitable receptacle and a knob 43 which can be turned or pressed depending upon the design to open a suitable valve (not shown) and permit the milk to flow. While the draw spout may be placed in the flexible bag in place of the closure cap 12, it is preferred that this exchange be made so that the draw spout will always be in the possession of the customer with advantages in cleanliness and costs.

In the embodiment shown in FIGS. 8, 9, and 10, the flexible bag 10 is supported in an outer container having a body portion 46 with a bag 47, top 48, bottom 49, and sides 51. These parts are all integral, body portion being molded in a single piece preferably from suitable plastic. A sloping false bottom 52 has its rear end supported on a spacer 53 and its forward end welded at 54 to the bottom 49.

The sides 51 have side projections 56 facing outwardly and they are engaged in edge slots formed in a removable panel 57 having a bottom piece at 58 which permits the front panel to be slid vertically into position as shown in FIG. 8 or to be raised to remove an empty flexible bag 10 and insert a new one. A clear strip 58 is provided in the panel 57 to form a sighting area through which the amount of deflation of the plastic bag 10 and the approximate amount of milk left in the container can be determined. A small hole 59 in the top 48 provides a passageway for the entrance of air to replace the milk as the bag collapses. This opening may, of course, be provided in the panel if desired. The panel 57 can be raised, of course, by merely grasping the sides forming the groove or channel in which the projections 56 lie.

My invention is particularly concerned with the package provided in the refrigerator as shown particularly in FIG. 4 or as shown in modification in FIG. 8. As already stated, this identical package may be used for vending purposes but something much simpler and much less expensive may be utilized during the transportation stage. FIG. 2 illustrates the fact that another container substantially identical with that shown in FIG. 4 may be used if desired for transportation purposes. Any simple, inexpensive carrying container, however, for transporting the milk filled flexible bag 10 to the point of ultimate use may be utilized.

I have pointed out that the flexible bag is suitably formed of sheet plastic. The outer container is also suitably formed of plastic either by injection molding, by vacuum molding or by means of any of the known techniques for producing a single piece body of a required shape. While the entire outer container may be formed of clear plastic, good results are obtained and with some saving in cost of materials by using an opaque plastic for the body portion and either a clear plastic removable panel as shown in FIG. 4 or a panel having a transparent strip as shown in FIG. 8. When milk is vended by means of a composite milk package produced in accordance with the invention disclosed hereinabove, the overall cost of delivery for each milk unit is decreased. In addition to the convenience offered to the housewife, there is the added advantage that her refrigerator can hold more milk when the package of the present invention is used, and normally the amount of milk delivered to the housewife, particularly if there are children involved, is markedly increased.

I have disclosed my invention in detail so that those skilled in the art may understand the manner of practicing the same but the scope of the invention is defined by the claims.

I claim:

1. A milk package or the like, comprising
   (a) a flexible collapsible bag adapted to contain a liquid,
   (b) a spout through which liquid may be withdrawn from said flexible bag,
   (c) a container support in the form of an outer form retaining package having a single piece generally rectangular container body having five closed sides and one open side,
   (d) means forming edge and bottom slots on said container support at said open side, and
   (e) a panel slidable in said slots to close said open side,
   (f) said panel adapted to engage said spout, and
   (g) operative means on said spout outside said container, whereby liquid may be withdrawn from said bag when said container is in a closed condition.

2. A milk package or the like, comprising
   (a) a flexible collapsible bag adapted to contain a liquid,
   (b) a spout through which liquid may be withdrawn from said flexible bag,
   (c) a container support in the form of an outer form retaining package having a single piece generally rectangular container body having five closed sides and one open side, (d) means forming edge and bottom slots on said container support at said open side,
(e) a panel slidable in said slots to close said open side,
(f) means in said slidable panel forming a bottom recess having sides and top shaped to engage said spout and hold the same firmly near a bottom surface of said container support, and
(g) operative means on said spout outside said container, whereby liquid may be withdrawn from said bag when said container is in a closed condition.

3. A milk package or the like, comprising
(a) a flexible collapsible bag adapted to contain a liquid,
(b) a spout through which liquid may be withdrawn from said flexible bag,
(c) a container support in the form of an outer form retaining package having a single piece generally rectangular container body having five closed sides and one open side,
(d) means forming edge and bottom slots on said container support at said open side,
(e) a panel slidable in said slots to close said open side,
(f) means forming a bottom recess having sides and top shaped to engage said spout and hold the same firmly near a bottom surface of said container support,
(g) operative means on said spout outside said container, whereby liquid may be withdrawn from said bag when said container is in a closed condition,
(h) and means providing visibility through said front panel into the interior of said outer package.

4. A milk package or the like, comprising
(a) a flexible collapsible bag adapted to contain a liquid,
(b) a spout through which liquid may be withdrawn from said flexible bag,
(c) a container support in the form of an outer form retaining package having a single piece generally rectangular container body having five closed sides and one open side,
(d) means providing a bottom inside surface sloping downwardly from rear to front of the outer container,
(e) means forming edge and bottom slots on said container support at said open side, and
(f) a panel slidable in said slots to close said open side,
(g) said panel adapted to engage said spout, and
(h) operative means on said spout outside said container, whereby liquid may be withdrawn from said bag when said container is in a closed condition.

5. A milk package or the like, comprising
(a) a flexible collapsible bag adapted to contain a liquid,
(b) a spout through which liquid may be withdrawn from said flexible bag,
(c) a container support in the form of an outer form retaining package having a single piece generally rectangular container body having five closed sides and one open side,
(d) means providing a bottom inside surface sloping downwardly from rear to front of the outer container,
(e) means forming edge and bottom slots on said container support at said open side,
(f) a panel slidable in said slots to close said open side,
(g) means in said slidable panel forming a bottom recess having sides and top shaped to engage said spout and hold the same firmly near a bottom surface of said container support,
(h) and operative means on said spout outside said container, whereby liquid may be withdrawn from said bag when said container is in a closed condition.

6. A milk package or the like, comprising
(a) a flexible collapsible bag adapted to contain a liquid,
(b) a spout through which liquid may be withdrawn from said flexible bag,
(c) a container support in the form of an outer form retaining package having a single piece generally rectangular container body having five closed sides and one open side,
(d) means providing a bottom inside surface sloping downwardly from rear to front of the outer container,
(e) means forming edge and bottom slots on said container support at said open side,
(f) a panel slidable in said slots to close said open side,
(g) means in said slidable panel forming a bottom recess having sides and top shaped to engage said spout and hold the same firmly near a bottom surface of said container support,
(h) operative means on said spout outside said container, whereby liquid may be withdrawn from said bag when said container is in a closed condition,
(i) and means providing visibility through said front panel into the interior of said outer package.

7. A milk package or the like comprising
(a) a flexible collapsible bag adapted to hold a supply of liquid,
(b) a spout through which liquid may be withdrawn from said flexible bag,
(c) a form retaining outer package housing said bag, said outer package being substantially rectangular with an open front and five integral sides, including
    (1) top, sides, and back panel,
    (2) a bottom panel diverging slightly in a forward direction from the top, and
    (3) an integral support aligned with the back panel to hold said top generally horizontal and said bottom sloping downwardly from rear to front,
(d) means forming edge and bottom slots framing said open front,
(e) a removable front panel supported in said slots, said panel having a bottom edge recess with sides and top shaped to engage said spout and hold the same in operable position, and
(f) operative means on said spout outside said container, whereby liquid may be withdrawn from said bag when said container is in a closed condition.

8. A milk package or the like comprising
(a) a flexible collapsible bag adapted to hold a supply of liquid,
(b) a spout through which liquid may be withdrawn from said flexible bag,
(c) a form retaining outer package housing said bag, said outer package being substantially rectangular with an open front, and five integral sides, including
    (1) top, sides, and back panel,
    (2) a bottom panel diverging slightly in a forward direction from the top, and
    (3) an integral support aligned with the back panel to hold said top generally horizontal and said bottom sloping downwardly from rear to front,
(d) means forming edge and bottom slots framing said open front,
(e) a removable front panel supported in said slots, said panel having a bottom edge recess with sides and top shaped to engage said spout and hold the same in operable position, at least a portion of said removable panel being transparent to permit visibility into the outer package, and (f) operative means on said spout outside said container whereby liquid may be withdrawn from said bag when said container is in a closed condition.

9. A milk package or the like comprising
(a) a flexible collapsible bag adapted to hold a supply of liquid,
(b) a spout through which liquid may be withdrawn from said flexible bag,
(c) a form retaining outer package housing said bag, said outer package being substantially rectangular with an open front and five integral sides, including
  (1) top, sides, and back panel,
  (2) a bottom panel diverging slightly in a forward direction from the top, and
  (3) an integral support aligned with the back panel to hold said top generally horizontal and said bottom sloping downwardly from rear to front,
(d) means forming edge and bottom slots framing said open front,
(e) a removable front panel supported in said slots, said panel having a bottom edge recess with sides and top shaped to engage said spout and hold the same in operable position, said removable panel having a top opening therethrough to furnish a finger hold, and to permit entrance of air to replace liquid withdrawn from the bag, and
(f) operative means on said spout outside said container, whereby liquid may be withdrawn from said bag when said container is in a closed condition.

10. A milk package or the like comprising
(a) a flexible collapsible bag adapted to hold a supply of liquid,
(b) a spout through which liquid may be withdrawn from said flexible bag,
(c) a form retaining outer package housing said bag, said outer package being substantially rectangular with an open front and five integral sides, including top, bottom, sides and rear panels,
(d) a false bottom in the outer package providing a bag supporting surface sloping downwardly from rear to front,
(e) a removable panel closing said open front of the outer package body portion,
(f) a sliding connection between the removable panel and said body portion,
(g) said removable panel having a bottom edge recess with sides and top shaped to engage and hold said spout in fixed position, and
(h) operative means on said spout outside said container, wherby liquid may be withdrawn from said bag when said container is in a closed condition.

References Cited by the Examiner
UNITED STATES PATENTS

| | | | |
|---|---|---|---|
| 268,313 | 11/82 | Stokes et al. | 222—561 X |
| 2,314,562 | 3/43 | Sheaffer | 222—552 X |
| 2,686,613 | 8/54 | Tamminga | 222—146 X |
| 3,081,003 | 3/63 | Baxter et al. | 222—105 |
| 3,137,415 | 6/64 | Faunce | 222—183 |

LOUIS J. DEMBO, *Primary Examiner.*